Patented Apr. 14, 1925.

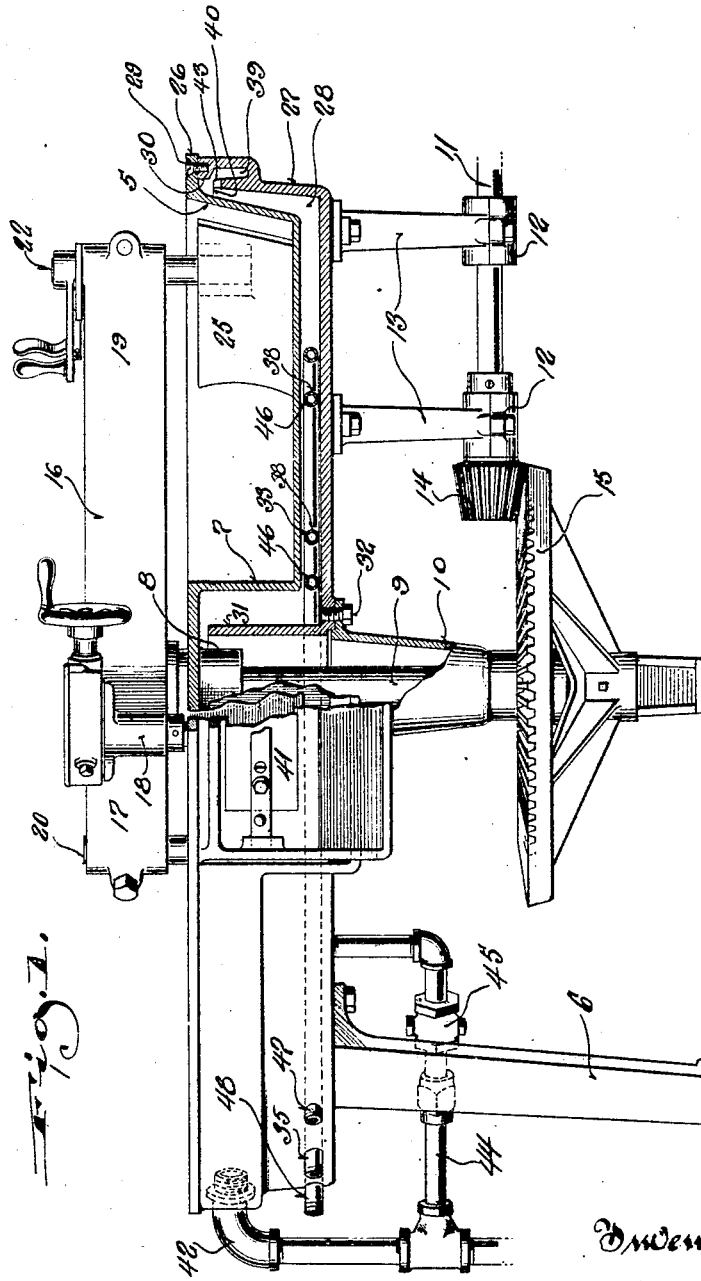

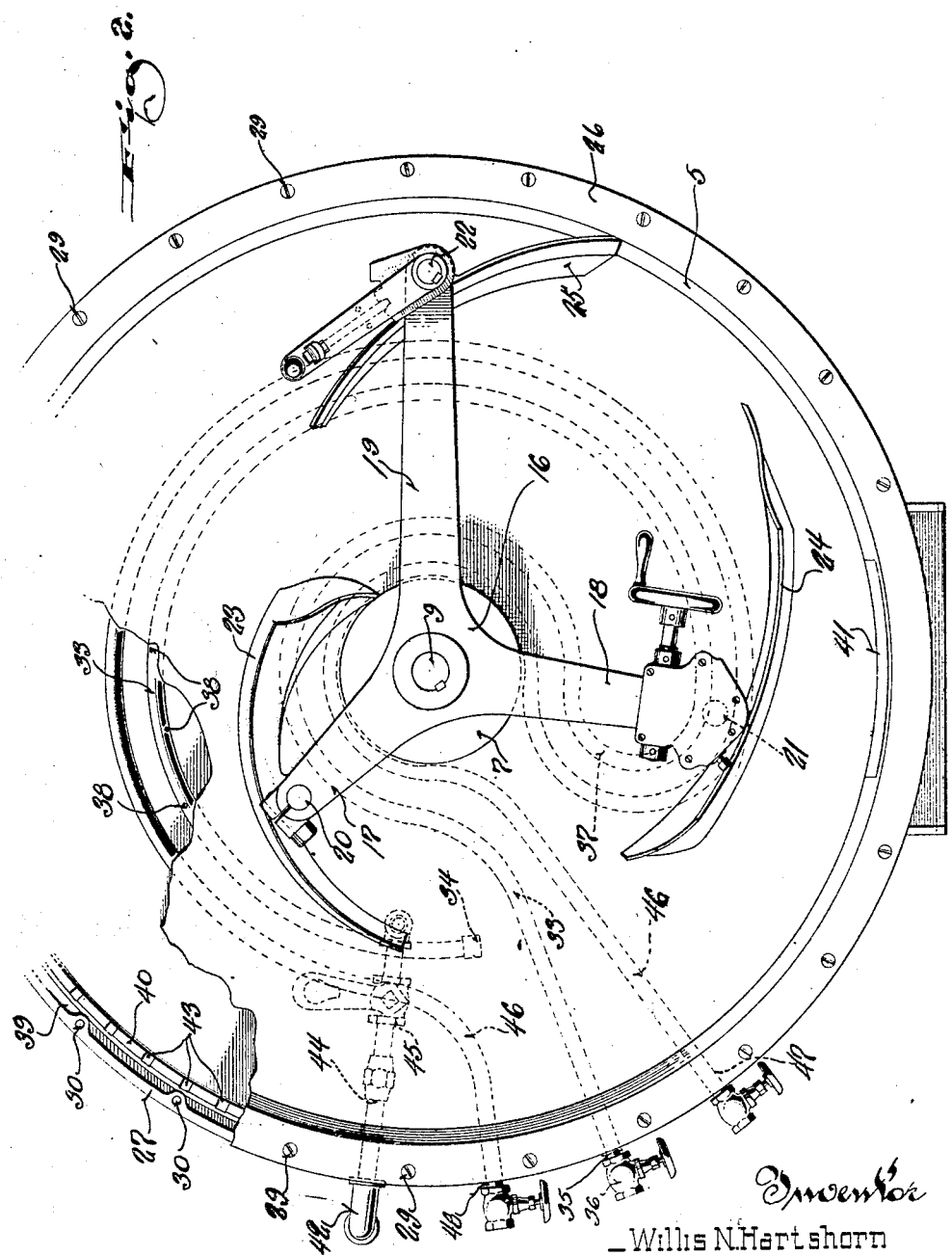

1,533,409

UNITED STATES PATENT OFFICE.

WILLIS N. HARTSHORN, OF RACINE, WISCONSIN, ASSIGNOR TO RACINE CONFECTIONERS' MACHINERY CO., OF RACINE, WISCONSIN, A CORPORATION OF WISCONSIN.

MATERIAL WORKING AND MIXING MACHINE.

Application filed October 22, 1923. Serial No. 670,127.

*To all whom it may concern:*

Be it known that I, WILLIS N. HARTSHORN, a citizen of the United States, and resident of Racine, in the county of Racine and State of Wisconsin, have invented new and useful Improvements in Material Working and Mixing Machines, of which the following is a description, reference being had to the accompanying drawings, which are a part of this specification.

This invention relates to certain new and useful improvements in material working and mixing machines capable of use in connection with the reducing, drying, mixing and working of chocolates, pastries and other confectionery materials.

It is highly desirable that the material receiving pan or container of machines of the character described be heated or cooled and to this end the containers have been jacketed to provide a chamber in which a temperature controlling medium flows, the chamber having an inlet and an outlet positioned at opposite sides thereof. This manner of regulating the container temperature has proven objectionable in that the medium flows substantially directly from the inlet to the outlet resulting in uneven heating or cooling of the container walls.

Several attempts have been made in the art to overcome this unequal temperature in the container wall and the patent to Shepherd No. 845,438, granted February 26, 1917, endeavors to provide means for maintaining a uniform temperature throughout the entire area of the bottom of the container.

Having the above and other objections in mind, this invetion has for a primary object to provide means for maintaining the temperature of the container or pan walls substantially uniform.

It is another object of this invention to provide means for evenly distributing a cooling or heating medium in the jacket or chamber contacting with the pan or container walls.

A further object of this invention resides in the provision of means for evenly withdrawing the cooling or heating medium from the jacket space surrounding the container or receptacle to thus prevent the cooling or heating medium from flowing in a direct narrow path from inlet to outlet and consequently eliminating the formation of cold or hot spots in the container walls.

And a still further object of this invention resides in the provision of a spill-way at the upper peripheral edge of the jacket surrounding the container whereby the cooling or heating medium is evenly withdrawn from the jacket chamber at all points.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a view, partly in section and partly in side elevation, illustrating a material working machine embodying this invention, and Figure 2 is a top plan view thereof, parts being broken away and in section to illustrate structural details.

Referring now more particularly to the accompanying drawings, in which like numerals designate like parts throughout the several views, the numeral 5 designates a pan or container suitably supported by legs 6 and having a central, cylindrical projection 7 extended thereinto, as best shown in Figure 1.

The central projection 7 carries a vertical bearing member 8 in which the upper end of a vertical shaft 9 is journaled, the lower end of said shaft being journaled in a bearing mounted in the lower end of a housing 10 centrally suspended from the bottom of the machine. Shaft 9 is driven from a power shaft 11 which is connected with a suitable motor or other source of power and is journaled in bearings 12 carried by hangers 13. The inner end of shaft 11 has a drive pinion 14 secured thereto which meshes with a relatively large beveled gear 15 mounted on the lower end of shaft 9.

A spider member 16 having radial arms 17, 18 and 19 is fixed to the upper end of shaft 9 and mounts material working blade members, to be hereinafter described. Adjustably secured in the outer ends of the arm 17, 18 and 19 are blade member carrying stub shafts 20, 21 and 22, respectively, the lower ends of which mount material working members 23, 24 and 25, respectively. The operation and adjustment of the members 23, 24 and 25 is clearly described and illustrated in Letters Patent No. 1,345,542, granted me July 6, 1921, and reference may be had thereto for a detailed description of its operation.

The pan or container 5 has its outer peripheral edge flanged or directed laterally, as at 26, to engage the upper outer edge of a jacket 27 in which the pan is nested with its side and bottom walls spaced from the side and bottom walls of the jacket to provide a chamber or space 28 therebetween. The pan 5 is detachably secured in the jacket 27 by suitable machine screws or other means 29 which pass through openings in the flange 26 and are threaded in the lugs or ears 30 formed in the peripheral edge of the jacket.

The jacket 27 is provided with a central opening to accommodate shaft 9, and surrounding the central opening is an upstanding annular flange 31 which extends to substantially the top of the central projection 7 of the pan. The housing 10 is secured to the jacket 27 in register with the central opening therein by members 32.

Mounted within that portion of space 28 between the bottom walls of the pan 5 and jacket 27 is a coil 33, one end 34 thereof being closed and the other end 35 thereof connectable with a source of cooling or heating fluid, not shown, through a valve 36. Coil 33 is of the shape illustrated in Figure 2 having two substantially concentric coils connected by a return bend 37. The coil 33 is provided with a plurality of outlet ports or openings 38 arranged to discharge in opposite directions so that the cooling or heating medium is substantially uniformly distributed throughout the chamber 28.

An annular trough or spill-way 39 is provided along the peripheral edge of the jacket side wall, which communicates with compartment 28 at its highest point over the spill-way or trough edge 40. The spill-way or trough 39 is unbroken except for the width of the discharge door 41 leading from the interior of the pan 5, and an over-flow or discharge pipe 42 leads therefrom to the sewer or other place of discharge, not shown.

In operation, the heating or cooling medium, such as water or the like, enters the chamber or space 28 at numerous points through the ports or openings 38 and is evenly drawn from the container over the edge 40 thus preventing a flow of the medium in a direct path from the inlet to the outlet. If desired edge 40 may be provided with a plurality of notches 43 through which the cooling or heating medium flows into the trough and thence outwardly through the discharge 42. A drain 44 having a valve 45 therein leads from the bottom of the space 28 to the discharge pipe 42 to facilitate draining the same.

In the event it is desired to heat the pan wall by steam in lieu of hot or warm water, a steam coil 46 is provided of a shape similar to coil 33 but having both of its ends disposed exteriorly of the jacket 27, the inlet 47 thereof being connectible with a source of steam or other heating medium, not shown, and the outlet 48 thereof with a suitable return, not shown. When the coil 46 is employed, the space 28 is preferably filled with water which is maintained at the desired temperature by the medium supplied coil 46 which by reason of its shape maintains the water at a uniform temperature throughout substantially the entire area of space 28.

From the foregoing description taken in connection with the accompanying drawings it will be readily apparent to those skilled in the art to which an invention of this character appertains that I provide means for heating and cooling the material receiving pan or container, which prevents the formation of paths of cooling or heating medium across the pan bottom and the consequent uneven cooling or heating thereof, and which insures the maintenance of the material receiving pan or container walls at a substantially uniform temperature.

What I claim as my invention is:

1. In a machine of the character described including a jacket member, a container nested in the jacket member, the side and bottom walls of the jacket member and container being spaced to provide a temperature regulating chamber and means for introducing a temperature controlling fluid in said chamber, an annular trough surrounding the upper portion of the jacket member, an annular spill-way passage communicating the temperature regulating chamber with said trough and a fluid outlet communicating with said trough whereby the temperature controlling fluid is substantially evenly withdrawn from the chamber by over-flowing into the trough through said spill-way passage.

2. In a machine of the character described including a jacket member and a container nested in the jacket member, the side and bottom walls of the jacket member and container being spaced to provide a temperature regulating chamber, a temperature regulating medium supply member disposed in the lower portion of said chamber and including substantially concentric coils connected by a return bend, an annular trough surrounding the upper portion of the jacket member, an annular spill-way passage communicating the temperature regulating chamber with the annular trough, and a fluid outlet communicating with said trough whereby the temperature controlling fluid is substantially evenly withdrawn from the chamber by over-flowing into the trough through said spill-way passage.

3. In a machine of the character described including a jacket member and a container nested in the jacket member, the side and bottom walls of the jacket member and container being spaced to provide a temperature regulating chamber, a cooling medium supply member disposed in the lower portion of said chamber and including substantially concentric coil portions connected by a return bend, a heating medium supply including substantially concentric coil portions connected by a return bend, said supply members being intermingled, means for independently connecting said supply members with their respective sources of supply, an annular trough surrounding the upper portion of the jacket member, an annular spill-way passage communicating the temperature regulating chamber with the annular trough, and a fluid outlet communicating with said trough whereby the temperature controlling fluid is substantially evenly withdrawn from the chamber by over-flowing into the trough through said spill-way passage.

In testimony whereof I affix my signature.

WILLIS N. HARTSHORN.